United States Patent [19]

Ohya et al.

[11] Patent Number: 4,747,097
[45] Date of Patent: May 24, 1988

[54] MULTIPLEX TRANSMISSION SYSTEM

[75] Inventors: Harutada Ohya, Tokyo; Katsutoshi Tagami, Saitama; Yoshikazu Tsuchiya, Saitama; Kazuo Nakamura, Saitama; Hayato Muneyuki, Saitama; Yoshio Mase; Masaru Nishijimi, both of Tokyo, all of Japan

[73] Assignees: Oki Electric Industry Co., Ltd.; Honda Giken Kogyo Kabushiki Kaisha, both of Tokyo, Japan; a part interest

[21] Appl. No.: 839,707

[22] Filed: Mar. 12, 1986

[30] Foreign Application Priority Data

Mar. 12, 1985 [JP] Japan .................. 60-48841
Mar. 12, 1985 [JP] Japan .................. 60-48845

[51] Int. Cl.$^4$ .................. H04J 1/16; H04J 3/14
[52] U.S. Cl. .................. 370/88; 370/16
[58] Field of Search .................. 370/86, 89, 88, 13–16; 340/825.05

[56] References Cited

U.S. PATENT DOCUMENTS

| | | | |
|---|---|---|---|
| 3,879,710 | 4/1975 | Maxemchuk et al. | 370/89 |
| 4,002,842 | 1/1977 | Meyr et al. | 370/86 |
| 4,049,921 | 9/1977 | Zwack | 370/89 |
| 4,156,798 | 5/1979 | Doelz | 358/257 |
| 4,460,994 | 7/1984 | Scanlon et al. | 370/88 |
| 4,527,270 | 7/1985 | Sweeton | 370/16 |
| 4,530,085 | 7/1985 | Hamada et al. | 370/16 |

Primary Examiner—Douglas W. Olms
Assistant Examiner—Wellington Chin
Attorney, Agent, or Firm—Bogucki, Scherlacher, Mok & Roth

[57] ABSTRACT

A multiplex transmission system (100) in which any ($N_i$) of a plurality of nodes ($N_1$–$N_n$) connected loop-like with a bidirectional signal transmission path (1a, 1b) and each respectively connected to control one of a plurality of units of electrical equipment is adapted for transmitting, in a given order (i), a prepared signal ($A_i$, D) to the signal transmission path (1a, 1b) and for receiving a prepared signal ($A_i$, D; $A_x$, D) from the signal transmission path (1a, 1b), wherein any ($N_i$) of the nodes ($N_1$–$N_n$) has a rise-timing timer ($CNT_2$), on which a rise-timing time interval ($t_{i3}$, $t_{i4}$) of a length proper to this node ($N_i$) is set at a predetermined time point (54, 62, 71, 84, 88), and is adapted for rising to start signal transmission when the rise-timing timer ($CNT_2$) has timed out.

The signal transmission path (1a, 1b) includes a pair of signal transmission lines (1a, 1b), and any ($N_i$) of the nodes ($N_1$–$N_n$) is adapted, when this node ($N_i$) is at the order of signal transmission of its own, for transmitting the prepared signal ($A_i$, D) to the signal transmission lines (1a, 1b) and receiving the prepared signal ($A_i$, D; $A_x$, D) from one (1a) of the signal transmission lines (1a, 1b) and for checking the signal ($A_i'$, D') as thus received with the signal ($A_i$, D) as transmitted, to thereby diagnose for abnormality of the aforesaid one (1a) of the signal transmission lines (1a, 1b).

19 Claims, 5 Drawing Sheets

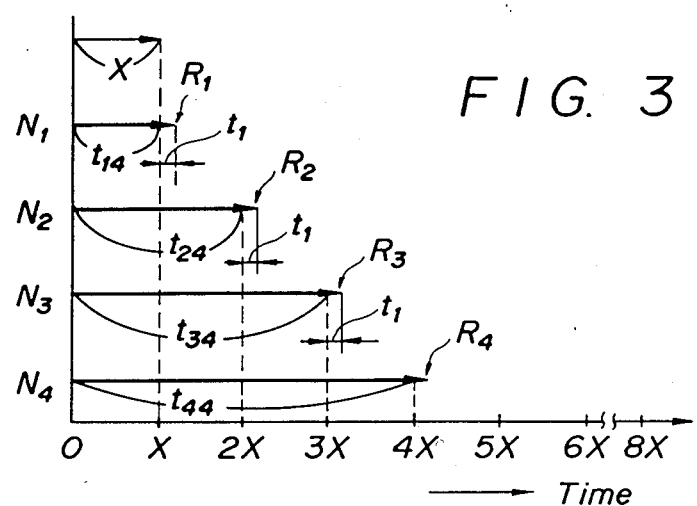
FIG. 3
FIG. 4B
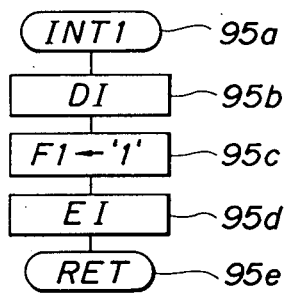
FIG. 4C
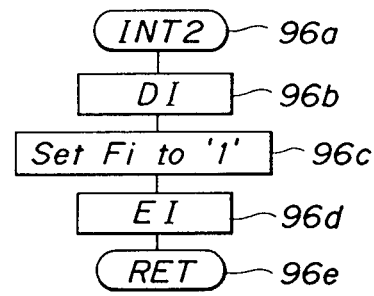
FIG. 5
| | Time up flag | appointing flag | function |
|---|---|---|---|
| $CNT_1$ | F1 | none | measuring Time base |
| $CNT_2$ | F2 | f2 | monitoring data D |
| | F3 | f3 | monitoring address Ai |
| | F4 | f4 | monitoring address Ai |

FIG. 6
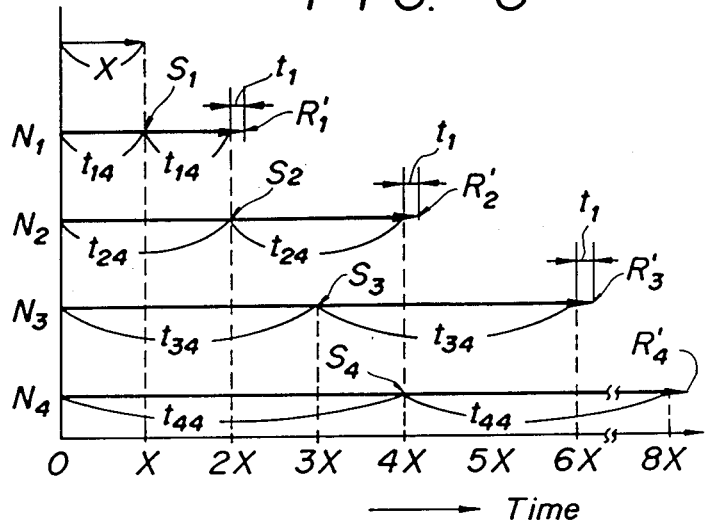
FIG. 7
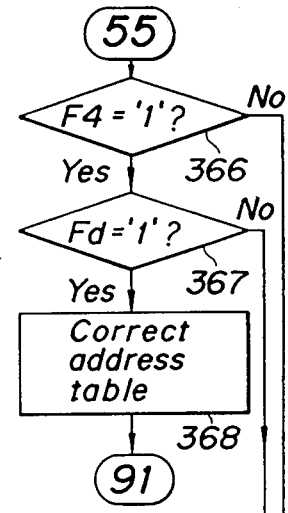
FIG. 8
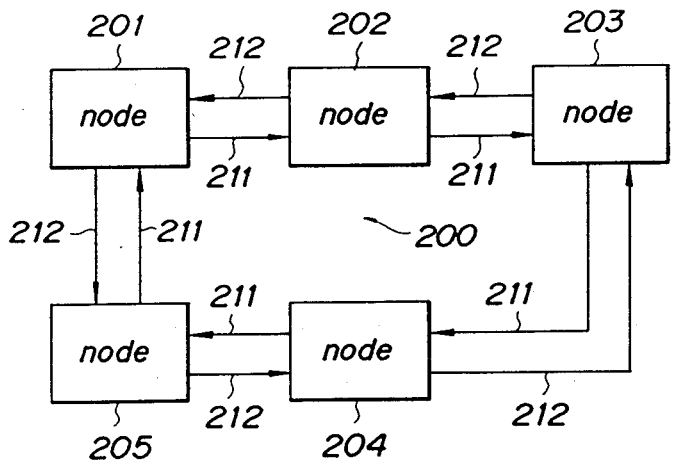
PRIOR ART
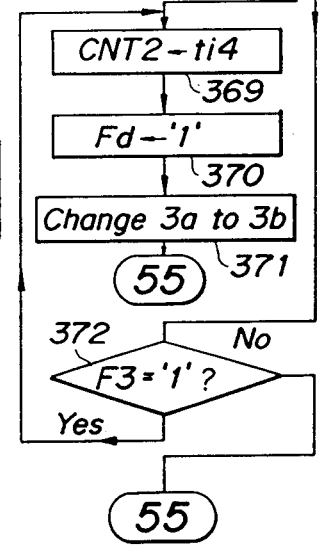

MULTIPLEX TRANSMISSION SYSTEM

BACKGROUND OF THE INVENTION

1. Field of the Invention

The present invention generally relates to a multiplex transmission system. More particularly, the invention relates to a multiplex transmission system of the type in which a plurality of units of electrical equipment and appliances disposed at various points of a vehicle, such as an air conditioner, a cruising controller, an intermittently operating wiper, and a variety of lamps, are connected loop-like by at least one wiring harness and besides the signal transmission and reception thereamong are effected in a multiplex manner through the wiring harness.

2. Description of Relevant Art

Recently, with an increase in the number of units of electrical equipment and appliances to be disposed at various points of a vehicle, the wiring harness for interconnecting such equipment and appliances tends to have an increased number of wires and hence to be enlarged in size, thus lowering the design feasibility, productivity, fittability, and maintainability of the wiring harness, while raising indirect costs such as for control and storage. In conjunction with such problems, there is a growing tendency to employ a multiplex transmission system in which a plurality of multiplex harness control devices (hereinafter called "nodes") are connected loop-like by at least one wiring harness and the signal transmission and reception thereamong is effected in a multiplex manner. Some examples of such multiplex transmission systems for vehicles are disclosed in "Jidosha Gitjutsu (Automobile Technology)" Vol. 38, No. 2, published 1984, at pages 215 to 221.

This reference includes comments on a number of types of multiple transmission systems, as follows.

According to the reference, multiplex transmission systems are classified into several types by the system of multiplexing, control, communication, and synchronization.

As multiplexing systems, there are enumerated a time division system and a wavelength division system, besides others; the former being suitable for multiplexing those transmission systems in which a wiring harness is employed as a signal transmission line, and the latter, for those in which an optical fiber is employed as a signal transmission line.

As control systems, typically there are two: a centralized control system in which principally a single node is responsible for the control of an entire system, and a distributed control system in which the control of a system is equally shared among a plurality of nodes. However, as a hybrid of typical systems, there may well exist a variety of control systems that are unable to be fairly classified into either of the typical two categories.

As communication systems, generally there are two: a parallel line system in which a signal of address and a signal of detection and control data are transmitted through separated lines, and a serial line system in which such signals are transmitted through a single line. In either system, there is additionally provided a power line with which respective nodes are connected loop-like.

The serial line system usually appears as either a message system in which an address signal and a detection and control data signal are combined to be transmitted as a single message, or a time-slot system in which an address signal is omitted while transmitting a series of detection and control data signals in a predetermined sequence.

As synchronization systems, there are employed two: an internal clock system in which respective nodes have clocks thereof, and an external clock system in which a clock signal is generated at a particular node and supplied therefrom to other nodes. In the latter system, the particular clock generator that is adapted to generate and supply the clock signal is used to govern the other nodes. Thus, this system may well be regarded as a variation of the centralized control system.

In this respect, in the centralized system, an entire system may be shut down with troubles at a master node. As a control system for the multiplex transmission system, therefore, the distributed control system is peferred to be employed, though in this case there is a desideratum to be attained by devising a communication system to avoid confusion of signal transmission among respective nodes.

Incidentally, when performing control of a load as an electrical equipment or appliance, it sometimes becomes necessary to execute a logical process in addition to on-off control of a single switch. Exemplarily, in the case of a vehicle, there are adduced reasons such as that some loads are required to have their patterns of action selectable depending on various positions of an ignition switch, such as "on", "off", "park", and "lock" positions and some loads such as a tail lamp are needed to be operable for on-off control from a plurality of switches such as a tail switch and a parking switch.

For such reasons, in general, in a time-division multiplex transmission system according to a distributed control system, each node is constituted with: (1) a combination of a transmitter and a receiver connected both to a wiring harness; (2) a detection circuit such as a sensor or a switch put under control of the node; (3) a drive circuit such as a relay or a power switch for starting a load such as a pump or a lamp put under control of the node; (4) a logic circuit connected to the detection circuit and the drive circuit; (5) a combination of a multiplexer and a demultiplexer for interconnecting the logic circuit with the transmitter and the receiver; and (6) a control circuit connected to, to cooperate with, the multiplexer and the demultiplexer and adapted for signal transmission to and reception from the wiring harness.

In the accompanying drawings, FIG. 8 is a schematic representation of a time-division multiplex transmission system for vehicles of such a type as suggested from the level of art described.

In FIG. 8, designated by reference character 200 is the multiplex transmission system, which employs a distributed control system as the control system, a message type serial line system as the communication system, and an internal clock system as the synchronization system.

The multiplex transmission system 200 is constituted with five ordinary nodes 201, 202, 203, 204, and 205 each respectively having such circuitries as (1)-(6) above, and a bidirectional bilateral signal transmission path (wiring harness) consisting of a pair of transmission lines 211, 212 with which the nodes 201 to 205 are connected loop-like.

As a starting method for multiplex transmission systems of such constitution, there is a generally employed system in which: among repetive associated nodes, a given one is selected in advance as a temporary master node; and the entire system begins to operate in harmony with the master node.

The node 201 is now supposed to be a temporary master node.

Then, there may well be employed a method in which, after application of power, the node 201 is first let to rise, that is, caused to start transmitting an address signal and a data signal, to thereby bring the entirety of the multiplex transmission system 200 into a raised state. Thereafter, the respective nodes are to be adapted to function for transmitting and receiving address and data signals, one after another, in a cyclic manner.

However, according to such system raising method, in the case where the node 201 as a temporary master node has failed to rise for some reason, the remaining nodes 202 to 205 are indefinitely left as they are waiting rise of the node 201, thus keeping the entirety of the transmission system 200 from exhibiting functions thereof.

Further, even if the temporary master node 201 has successfully risen after power application and hence the entirety of the system 200 has been started, it may so happen in employment of certain transmission line arrangements that, due to disconnection at either of the transmission lines 211, 212, the signal transmission and reception cycle by the nodes 201 to 205 will not advance.

Such state may occur under such a condition as well that, while the system 200 is operating, any node happens to malfunction.

As a conclusion, in respect of the distributed control system as applied to a time-division multiplex transmission system, there is a desideratum to be achieved to attempt to eliminate the possibility of malfunction of the entire system.

On the other hand, in the multiplex transmission system 200, it is necessary to execute a data check.

In this respect, in general, without limiting the description to multiplex transmission systems, as a checking method of an output signal on a signal transmission path there is employed a system in which check codes or data for error detection are added to the end of data to be transmitted; exemplarily, there being added such codes as horizontal and vertical parity check codes and a cyclic redundancy check code. Such check codes are used for checking whether the signal as output to the transmission path is varied due to effects such as noise from outside. According to such check system, a remarkably accurate data check is enabled by use of various check codes.

However, according to such data check systems, even when a signal transmitted from a certain node, which signal consists of an address signal, a data signal, and a check code, is varied by noises before signal reception at another node, the content of the signal as received at the latter node may be judged to be correct, because of an unexpected variation of the check code. If the data check is incorrect, various functions of the system itself may be unsuccessfully exhibited.

As a conclusion, in respect of the control system as applied to a multiplex transmission system, there is a desideratum to be achieved to permit the presentation of a more favorable data check system.

The present invention has been achieved to effectively solve such problems and substantiate such desiderata as described in conjunction with a conventional multiplex transmission system.

SUMMARY OF THE INVENTION

Accordingly, an object of the present invention is to provide a time-division multiplex transmission system which permits, even when a temporary master node has failed to rise for some reason, the remaining nodes to rise and besides, even if any node is caused to malfunction during operation of the system, the entire system to keep functioning in a possibly successful manner.

It is another object of the present invention to provide a time-division multiplex transmission system which has an excellent data check system.

According to the present invention, to achieve such object, there is provided a multiplex transmission system comprising a plurality of nodes each respectively connected to, for controlling, one of a plurality of electrical equipment units, and a signal transmission path for loop-like connecting the nodes, in which any of the nodes comprises a transmitting means connected, for transmitting a prepared signal, to the signal transmission path, a receiving means connected to, for receiving the prepared signal from, the signal transmission path, and a controlling means operatively connected to, for controlling, the transmitting means and the receiving means and connected to, for controlling, corresponding ones of the electrical equipment units each. of the nodes is adapted to perform signal transmission to the signal transmission path in a predetermined order and further comprises a rise-timing timer means adapted for setting thereon at a predetermined time point a rise-timing time interval of a length proper for the node. Each of the nodes is further adapted to rise for starting the signal transmission at a time point where the rise-timing timer means has timed out or up.

Preferably, the signal transmission path is adapted to be bilateral with a pair of signal transmission lines, The receiving means of each of the nodes is adapted to be connected to one of the signal transmission lines in an initializing phase after power application. Each of the nodes further comprises a diagnosing means adapted, when this node is controlling the signal transmission its own, for receiving through the receiving means the prepared signal as transmitted from the transmitting means to the signal transmission lines and for checking the signal as thus received with the signal as transmitted, to thereby diagnose for abnormality of the aforesaid one of the signal transmission lines.

The above and further features, objects and advantages of the present invention will more fully appear from the following detailed description of a preferred embodiment of the invention when the same is read in conjunction with the accompanying drawings.

BRIEF DESCRIPTION OF THE DRAWINGS

FIG. 3 is a time chart for showing various time intervals to be set on rise-timing timers of respective nodes of the multiplex transmission system.

FIGS. 4A to 4C are schematic flow charts of control processes of respective nodes of the multiplex transmission system.

FIG. 5 is a table describing the content of various flags to be used in the control processes of FIGS. 4A to 4C.

FIG. 6 is a time chart for showing various time intervals to be set on rise-timing timers according to a modified example of the embodiment.

FIG. 7 is a chart showing a control flow for operating the rise-timing timers according to the modified example.

FIG. 8 is a block diagram of the entirety of a time-division multiplex transmission system to be suggested from the level of art, as described.

DETAILED DESCRIPTION OF THE PREFERRED EMBODIMENT

Figure 1:
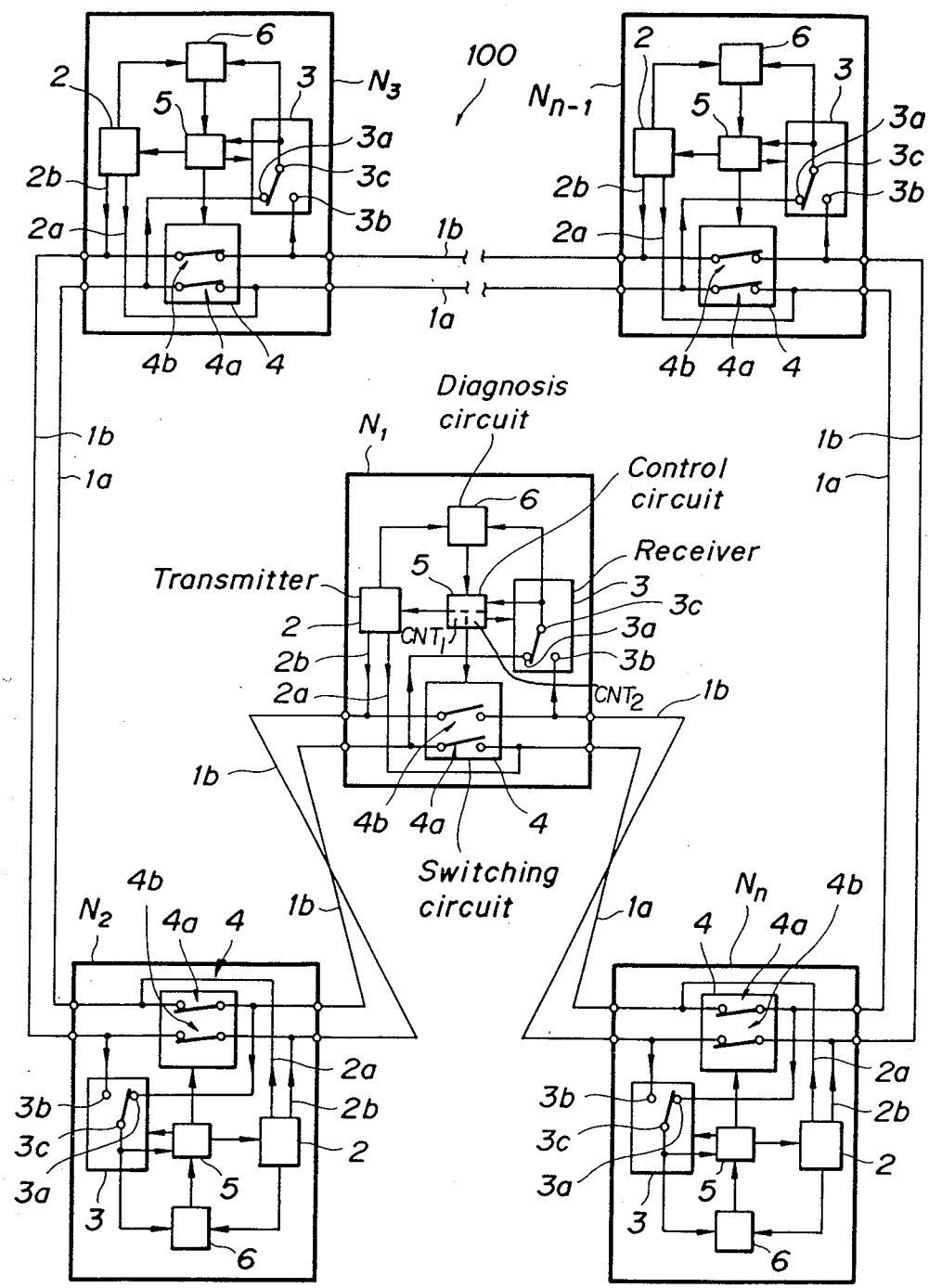
FIG. 1 is a block diagram of the entirety of a time-division multiplex transmission system according to a preferred embodiment of the present invention.

Referring first to FIG. 1, designated at reference numeral 100 is a time-division multiplex transmission system according to a preferred embodiment of the present invention. The multiplex transmission system 100 comprises first to n-th nodes $N_1$ to $N_n$ alike of circuit constitution, though being different in the content of control process, and a bilateral type transmission path consisting of a pair of signal transmission lines 1a, 1b with which the respective nodes $N_1$ to $N_n$ are connected in a looped manner. Incidentally, shown in FIG. 1 is a state of the system 100, in which the first node $N_1$ only is caused to function for transmitting a signal therefrom, leaving the other nodes $N_2$ to $N_n$ as they are devoted to functioning for receiving the signal.

The nodes $N_1$ to $N_n$ are each respectively adapted to function as a signal transmitting and receiving device, and have their sensors (not shown) as well as their drive circuits (not shown) for driving various loads (not shown) disposed in a vehicle.

Description of circuit constitution will now be made only of the first node $N_1$ that is adapted to initially serve as a temporary master node when the entire system 100 is powered on. In this connection it is advised that, as described, the respective nodes $N_1$ to $N_n$ have like circuitries.

The node $N_1$ comprises a transmitter 2 connected to the signal transmission lines 1a, 1b through a pair of signal output lines 2a, 2b adapted for outputting to supply to both of the transmission lines 1a, 1b a combination signal consisting of a signal including its own address of the node $N_1$ and a signal of data therefrom, a receiver 3 connected to the transmission lines 1a, 1b and adapted to receive from the lines 1a, 1b any signal that is transmitted therethrough to the node $N_1$, a switching circuit 4 installed in, for breaking and making, as required, a part of the bidirectional transmission path consisting of the transmission lines 1a, 1b, a diagnosis circuit 6 for checking to diagnose whether or not the content of a signal received by the node $N_1$ from either of the transmission lines 1a, 1b is equal to that of the combination signal as concurrently transmitted from the node $N_1$ itself to the lines 1a, 1b, and a control circuit 5 connected for control purpose to the transmitter 2, the receiver 3, the switching circuit 4, and the diagnosis circuit 6 as well as to those electrical equipments and appliances (not shown) which are put under control of the node $N_1$, the control circuit 5 being provided with various necessary devices such as an I/O (input/output) interface, a ROM (read only memory), a RAM (random access memory), and a CPU (central processing unit).

The transmitter 2 is adapted, any time when supplying information therefrom through the signal output lines 2a, 2b to the signal transmission lines 1a, 1b, to concurrently output therefrom either of a pair of signals of the same content to both of the transmission lines 1a, 1b. In this respect, however, the output lines 2a, 2b are separated from each other even in the transmitter 2.

The receiver 3 includes a pair of signal input terminals 3a, 3b connected to the signal transmission lines 1a, 1b, respectively, and a single reception terminal 3c adapted to be selectively connected to one of the input terminals 3a, 3b. The reception terminal 3c of the receiver 3 is connected, through unshown receiver elements, to the control circuit 5 and the diagnosis circuit 6 and adapted, when the system 100 is started, to be first connected to the input terminal 3a.

The switching circuit 4 comprises a pair of normal-closed type switches 4a, 4b installed in the signal transmission lines 1a, 1b, respectively, for breaking and making, as required, such respective parts thereof that are stretched across the node $N_1$ itself. More particularly, the switches 4a, 4b are opened while the node $N_1$ is caused to transmit a signal therefrom to the transmission lines 1a, 1b, and kept closed while the node $N_1$ is left as it is devoted to signal reception from the lines 1a, 1b.

The diagnosis circuit 6 is adapted to inform the control circuit 5 of abnormalities in the signal transmission line 1a or 1b and at any of the other nodes $N_2$ to $N_n$, by comparing the content of a signal received from the transmission lines 1a, 1b with that of a signal concurrently transmitted from the node $N_1$ to the lines 1a, 1b.

The control circuit 5 is adapted, while the node $N_1$ is put in a signal transmitting state thereof, to have the transmitter 2 transmit a signal, keeping the switches 4a, 4b of the switching circuit 4 as they are opened. It is advised in this connection that during such time interval, although the reception terminal 3c of the receiver 3 is connected to the control circuit 5, no direct signal is input from the terminal 3c to the circuit 5. Moreover, in a signal receiving and conducting state of the node $N_1$, in which a signal transmitted from any of the other nodes $N_2$ to $N_n$ is sent along the signal transmission lines 1a, 1b to the node $N_1$, to be received here, and needed to be further conducted along the transmission lines 1a, 1b across the node $N_1$, the control circuit 5 is adapted to have the receiver 3 receive the signal through the reception terminal 3c, permitting the signal to be processed in accordance with a prepared process control program, while leaving the switches 4a, 4b of the switching circuit 4 as they are closed.

The control and the diagnosis circuits 5, 6 are adapted to cooperate with each other to constitute a control process unit of the node $N_1$.

For the remaining nodes $N_2$ to $N_n$, which have like circuitries to the node $N_1$, description of circuit constitution is omitted.

In the multiplex transmission system 100, after lapse of a predetermined time from application of power thereto, the node $N_1$ is first caused to rise, that is, to start transmitting a signal. Thereafter, the remaining nodes $N_2$ to $N_n$ are caused to likewise rise in the order of $N_2$, $N_3$, $N_4$ (not shown), - - - , $N_{n-1}$, and $N_n$. After completion of signal transmission of the last node $N_n$, the first node $N_1$ again comes to rise. Such cycle of signal transmission of the nodes $N_1$ to $N_n$ is continuously repeated also thereafter, while the system 100 remains alive with power applied.

In this respect, the multiplex transmission system 100 is adapted such that the node to come to the next of i-th node $N_i$ (where number or suffix "i", which fundamentally is used for collective representation of respective integers between and inclusive of 1 and n, may be taken for arbitrary one of them if so construed from associated context) is selected to be i+1-th node $N_{i+1}$, depending on address signal $A_i$ transmitted from the node $N_i$ to the signal transmission lines 1a, 1b, provided that, to the next of the n-th node $N_n$, the first node $N_1$ comes to perform signal transmission therefrom.

It will be comprehended that, while any $N_i$ of the nodes $N_1$ to $N_n$ is transmitting a signal therefrom, the remaining nodes $N_i$ to $N_{i-1}$ and $N_{i+1}$ to $N_n$ are each respectively held in a signal receiving and conducting state thereof, leaving respective switches 4a, 4b of switching circuit 4 thereof as they are closed.

As described more fully below, each of the nodes is assigned an address number and the communication system 100 operates with repeating cycles. During each cycle the nodes transmit in the sequential order of their addresses with each node transmitting an address plus a data block around the communication loop to all of the other nodes and back to itself.

As each node transmits information it opens switches 4a and 4b while these switches remain closed at the receiving nodes. The transmitting node also uses its receiver 3 and diagnosis circuit 6 to monitor the transmitted signal which is placed on signal line 1a or 1b at one side of switch 4 and monitored at the other side. An error is thus detected unless the transmitted signal correctly passes all of the way around the communication loop and back to the transmitting node. If an error is detected, corrective measures are taken and the nodes are commanded to switch to the other, non-defective, transmission line 1a or 1b.

Two time interval counters $CNT_1$ and $CNT_2$ are provided at each node to provide a fail soft operating mode wherein failure of one or more nodes does not cause failure of the entire system 100. Counter $CNT_1$ operates on a recycling basis to provide a basic clock interval, $\frac{1}{2}t_1$. Time interval $t_1$ is the time required for a node to transmit one byte or 8 bits of information. The basic monitoring time interval is thus the time required to transmit 4 bits or $\frac{1}{2}$ byte.

Counter $CNT_2$ provides timing for longer time intervals that are measured by each of the nodes. Counter $CNT_2$ is loaded with one of 4 counter values, depending on circumstances, and a time out of counter $CNT_2$ indicates a malfunction at one of the nodes in system 100.

Each node transmits its own one byte address and a data block of fixed, predetermined length when its turn to transmit arrives. Each node also maintains an address table in address sequence that indicates the address and data byte length for each node. A value X can thus be determined that represents twice the number of bytes in the data block for a node having the longest data block plus two for the address byte (2 counts per byte).

The value of X is then multiplied by the node address number to provide a count interval value $t_{i4}$ which is different for each node. Time interval $t_{i4}$ is an integer multiple of basic timing interval $\frac{1}{2}t_1$. During power on initialization a value of ten times $t_{i4}$ is loaded into counter $CNT_2$ at each node to assure that no time out occurs before the first node in the sequence completes its initialization procedure. Thereafter the value $t_{i4}$ is loaded into counter $CNT_2$ each time a node completes its address and data transmission sequence. A time out indicates that a node has failed to respond in its turn. If this occurs the lowest numbered node times out first and begins a new transmission cycle. All nodes delete the faulty node from their address table.

Counter $CNT_2$ is also used to monitor a condition wherein a node transmits its address but fails to transmit a proper data block.

After each address is received the receiving nodes load into counter $CNT_2$ a value $t_2$ representing the expected data transmission time for the currently transmitting node plus $\frac{1}{2}t_1$. Time interval $t_2$ is thus an integer multiple of basic timing interval $\frac{1}{2}t_1$. If the current node transmits its address but fails to transmit its data block then time $t_2$ times out simultaneously at each node. Each node then advances an address point to the next node in sequence and loads counter $CNT_2$ with a value $t_{i3}$ equal to $t_{i4} - \frac{1}{2}t_1$. Normally, the next node in sequence would begin transmitting and normal transmission would resume. However, if it does not, the effect is much the same as when time interval $t_{i4}$ times out and the lowest numbered active node times out first and restarts the sequential transmission cycles.

FIG. 2A is a time chart of respective address signals $A_i$ and data signals D sequentially transmitted from various nodes $N_i$ to the signal transmission lines 1a, 1b of the multiplex transmission system 100, whereas, the elimination of complicatedness, there are exemplarily shown no more than signals $A_i$ and D from the first to third nodes $N_1$, $N_2$, $N_3$, for a time interval in which these nodes $N_1$, $N_2$, $N_3$ are caused to rise in turn for the first time after the transmission system 100 has been started with application of power.

Upon the application of power to the transmission system 100, each node $N_i$ thereof has its programmed initialization process executed and input terminal 3a of its receiver 3 is selected to be connected to reception terminal 3c of same. Therafter, signal transmission and reception among the nodes $N_1$ to $N_n$ to be performed in a later-described manner.

Incidentally, each node $N_i$ has built, in control circuit 5 thereof, a synchronizing time counter $CNT_1$ and a triggering and supervising time counter $CNT_2$.

There will be described below respective functions of the time counters $CNT_1$ and $CNT_2$.

The synchronizing counter $CNT_1$ of each node $N_i$ is adapted, when once reset, to repeat measuring a time-base interval $\frac{1}{2}t_1$ as a basic time interval for timing signal transmission. At the time when the counter $CNT_1$ has timed up, that is, when the set time $\frac{1}{2}t_1$ is just over, a corresponding flag $F_1$ (time-up flag, FIG. 5) is set to "1" irrespective of the state that the flag $F_1$ is then put in.

The triggering and supervising counter $CNT_2$ of each node $N_i$ is adapted to measure, as circumstances require, one of two rise-timing time intervals $t_{i3}$ and $t_{i4}$ (provided that the suffix "i" of each of the terms $t_{i3}$, $t_{i4}$ shall read "x" or "j" if so construed from the context) preset in consideration of some requisites for the node $N_i$ to which the counter $CNT_2$ in concern belongs or a preset monitoring time interval $t_2$ for timing the transmission of data signal D of the node $N_i$ that depends on address signal $A_x$ (where "x" is an arbitrary integer between and inclusive of 1 and n, while excluding i as a particular numeral) as just received by the node $N_i$ from any $N_x$ of the remaining nodes $N_1$ to $N_{i-1}$ and $N_{i+1}$ to $N_n$. Incidentally, to make accord with the naming of the latter interval $t_2$, the former intervals $t_{i3}$ and $t_{i4}$ may be called as monitoring time intervals for timing the transmission of address signal $A_i$ of the node $N_i$. At the time when the counter $CNT_2$ has timed up, a flag $F_2$ or $F_3$ or $F_4$ (time-up flag, FIG. 5) corresponding to the set time $t_2$ or $t_{i3}$ or $t_{i4}$ respectively is set to "1".

Incidentally, the function of the foregoing flags $F_1$, $F_2$, $F_3$, and $F_4$ will be described later in conjunction with FIG. 5.

Figure 2:
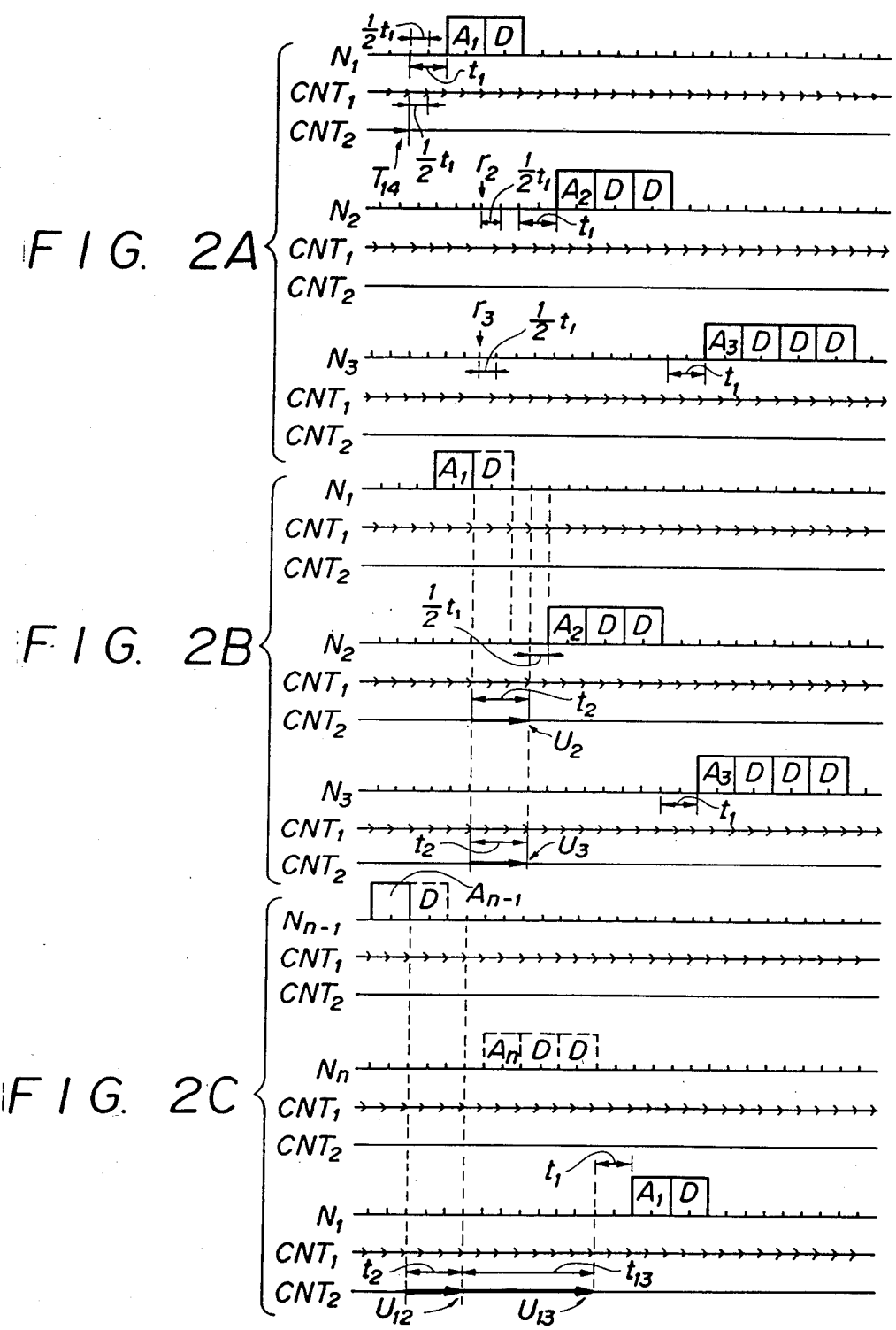
FIGS. 2A to 2C are time charts for showing the sequence of address signals and data signals to be transmitted from respective nodes to a signal transmission path of the multiplex transmission system.

Further, in the time chart of FIG. 2A, there are exemplarily shown various mutual relations of the timing for transmission of respective address signals $A_1$, $A_2$, $A_3$ and data signals D from the first, second, and third nodes $N_1$, $N_2$, and $N_3$ to the signal transmission lines 1a, 1b, as well as associated time-up points of respective synchronizing counters $CNT_1$ of the nodes $N_1$, $N_2$, $N_3$. Though, practically, in line with the count by these counters $CNT_1$ there being made also the count by respective triggering and supervising counters $CNT_2$ of the nodes $N_1$, $N_2$, $N_3$, FIG. 2 has omitted representation of the latter to avoid complicatedness, except for an initial time-up point $T_{14}$ of the counter $CNT_2$ at the first node $N_1$.

At the respective nodes $N_1$ to $N_n$, after input terminals 3a of their receivers 3 have been selected and connected to reception terminals 3c of same, the respective counters $CNT_1$ and $CNT_2$ are caused to start counting.

In this connection, upon completion of the initialization process, the counter $CNT_2$ of each node $N_i$ has first set thereon a time interval of a $10 \cdot t_{i4}$ length as a tenfolded initial-phase version of the preset rise-timing period $t_{i4}$.

Incidentally, though limited to the first to fourth nodes $N_1$ to $N_4$, the preset length of respective rise-timing intervals $t_{i4}$ is given in a graph of FIG. 3. In this graph, represented by capital letter X is a unit time length that corresponds to the longest one out of respective necesssary time intervals for transmission of signals of the nodes $N_1$ to $N_n$, and has such a relationship to each rise-timing interval $t_{i4}$ that $t_{i4} = X \cdot i$.

As a result, the rise-timing interval $t_{i4}$ is preset to be shortest at the first node $N_1$ where $i = 1$, and hence in the initial stage the counter $CNT_2$ of this node $N_1$ is to have timed up earlier than any of the counters $CNT_2$ of the other nodes $N_2$ to $N_n$. This time-up point is exemplarily marked at $T_{14}$ on the time axis in the time chart of FIG. 2A.

Incidentally, at such time point, the node $N_1$ has already started the counter $CNT_1$ thereof, as shown in FIG. 2A. In the time chart of FIG. 2A, like the case of other Figures, arrow marks plotted on the time axes of the counters $CNT_1$ represent respective time points where the counters $CNT_1$ have timed up.

After lapse of a monitoring interval $t_1$ as a double of the time-base interval $\frac{1}{2}t_1$ from the time-up point $T_{14}$ of the counter $CNT_2$ of the first node $N_1$, this node $N_1$ is triggered to transmit therefrom address signal $A_1$ followed by data signal D to the signal transmission lines 1a, 1b, while having and holding the switches 4a, 4b of the switching circuit 4 opened. The address signal $A_1$ of the first node $N_1$ is then received together with the data signal D thereof by the node $N_1$ itself, at the reception terminal 3c of its own receiver 3, and read into the diagnosis circuit 6. During such signal transmitting state of the node $N_1$, respective switches 4a, 4b of switching circuits 4 of the remaining nodes $N_2$ to $N_n$ are all kept closed.

In this connection, it is now advised that the address signal $A_i$ of any node $N_i$ has the word length thereof fixed to be a single byte of which start bit as the MSB (most significant bit) is set to "1", while the number of bytes of the data signal D is irregular among the nodes $N_1$ to $N_n$ but proper to each node $N_i$. In this respect, practically, it may well so follow that $n \leq 128$. More particularly, for the first, second, and third nodes $N_1$, $N_2$, and $N_3$, the word length of the data signal D is predetermined to be one, two, and three bytes, respectively, in this embodiment; for the remaining nodes $N_4$ to $N_n$ also that of the data signal D may be predetermined adequate as a matter of course.

Moreover, it is advised that, in the transmission system 100, each of the address and the data signals $A_i$, D of any node $N_i$ is transmitted so as to have the first four bits thereof as well as the last four bits thereof sent to any node $N_j$ (where "j" is used in the same sense as i) within a period corresponding to the time-base interval $\frac{1}{2}t_1$ to be measured by the synchronizing counter $CNT_1$.

Further, at each node $N_x$, upon completion of reception of the address signal $A_i$ from any node $N_i$, the counter $CNT_1$ of its own is reset.

In the time chart of FIG. 2A, a time point where the respective synchronizing counters $CNT_1$ are reset with the address signal $A_1$ from the first node $N_1$ is marked on the time axes of the second and third nodes $N_2$ and $N_3$, at $r_2$ and $r_3$, respectively. It will be easily understood that, at the same time point, also the counters $CNT_1$ of the remaining nodes $N_4$ to $N_n$ are all reset. The respective nodes $N_2$ to $N_n$ and the node $N_1$ are thus synchronized of the timing for signal transmission.

With complete data signal D transmitted from the first node $N_1$, the respective nodes $N_2$ to $N_n$ at the reception side execute various associated signal processes, as required, that is, some of them are not obliged to respond to the data signal D from the node $N_1$. Necessary times for such processes are set extremely short, when compared with the time-base interval $\frac{1}{2}t_1$.

On the other hand, with the address signal $A_1$ received from the first node $N_1$, each of the nodes $N_2$ to $N_n$ is caused to increment an address pointer thereof, thereby judging whether or not its own signal transmission should be made next, as will be described later.

Here, only the second node $N_2$ judges, according to its address pointer, that its own signal transmission should be made next. Each of the remaining nodes $N_3$ to $N_n$, judging that the order of its own signal transmission will not come next, enters a waiting state thereof, where it waits signal transmission from the second node $N_2$.

Moreover, the node $N_2$, after the judgment that the order of its own signal transmission should come next, again increments the address pointer just before the signal transmission of its own. It should be noted that, also in the case of any other node $N_i$, such additional increment is to be necessarily given under similar conditions.

At the first node $N_1$, after the transmission of the combination signal of the address and the data signals $A_1$, D, there is made by the diagnosis circuit 6 a judgment whether or not the same signal as the conbination signal that the node $N_1$ has just transmitted (to both of the signal transmission lines 1a, 1b) is received (from selected one of the lines 1a, 1b, that is, from the line 1a in this case) by the node $N_1$ itself, while the switches 4a, 4b of the switching circuit 4 are both closed. If the same signal is not received, whereby detection is made of an abnormality of one 1a of the signal transmission line 1a, 1b such as disconnection thereof or unexpected disturbance thereto or an abnormality of any other node $N_i$, information thereon is notified to the control circuit 5, which in turn gives, at a time point where the time-base interval $\frac{1}{2}t_1$ has just elapsed after completion of the transmission of signal $A_1$, D from the node $N_1$, a command to have the input terminal 3b (in place of the other input terminal 3a) selected to be connected to the reception terminal 3c of the receiver 3. Then, at the time of the node $N_1$'s own signal transmission in the next cycle, the node $N_1$ has added, at the rear of data signal D therefrom, abnormality information data informing that the signal transmission of the node $N_1$ in the last cycle was in effective. Since the word length of data signal D from any node $N_i$ is proper to the node $N_i$, as described, each of the nodes $N_2$ to $N_n$ is permitted to recognize the abnormality information data added to the data signal D of the node $N_1$. Thereafter, with rise-timing interval $t_{14}$ set on the counter $CNT_2$, the node $N_1$ enters a waiting state thereof, where it waits signal transmission from any of the remaining nodes $N_2$ to $N_n$.

It is now advised that such diagnosis for abnormalities and addition of abnormality information data are likewise performed at each of the remaining nodes $N_2$ to $N_n$ as well, though description thereof is omitted.

After lapse of the monitoring interval $t_1$ as double of the time-base interval $\frac{1}{2}t_1$ from the completion of signal transmission of the first node $N_1$, the second node $N_2$ has switches 4a, 4b of switching circuit 4 thereof opened and starts signal transmission thereof, that is, transmission of a combination signal consisting of an address signal $A_2$ and a data signal D of a 2-byte length.

Upon completion of signal transmission from the second node $N_2$, the other nodes $N_1$ and $N_3$ to $N_n$ execute their associated signal processes, as required.

At each of the nodes $N_1$ and $N_3$ to $N_n$, in accordance with its reception of the address signal $A_2$, it address pointer is incremented, to thereby judge whether or not the order of its own signal transmission should come next. Here, based on the address pointer, only the third node $N_3$ is to judge that its own signal transmission should be made next. Each of the remaining nodes $N_1$ and $N_4$ to $N_n$, judging that the order of its own signal transmission will not come next, enters a waiting state thereof, where it waits signal transmission from the third node $N_3$.

At the second node $N_2$, after transmission of the address and the data signals $A_2$, D the switches 4a, 4b of the switching circuit 4 are both closed. Then, with rise-timing interval $t_{24}$ set on the counter $CNT_2$, the node $N_2$ enters a waiting state thereof, where it waits signal transmission from any of the remaining nodes $N_1$ and $N_3$ to $N_n$.

After lapse of the monitoring interval $t_1$ from the completion of signal transmission of the second node $N_2$, the third node $N_3$ has switches 4a, 4b of switching circuit 4 thereof opened and starts signal transmission thereof, that is, transmission of a combination signal consisting of an address signal $A_3$ and a data signal D of a 3-byte length.

Hereafter, the fourth to n-th nodes $N_4$ to $N_n$ are to likewise make signal transmission thereof one after another in the ascending order of suffix number, thereby completing one cycle of signal transmission in the system 100. Then, to the place of the first node $N_1$, there again comes around the order of signal transmission. Like this, in the system 100, such cycle of signal transmission is ceaselessly repeated. In this respect, it will be understood that, when the n-th node $N_n$ has transmitted therefrom a combination signal consisting of an address signal $A_n$ and a data signal D, the first node $N_1$ makes upon reception thereof a judgment that the order of signal transmission of its own should come next.

In the signal transmission cycle described, the triggering and supervising counter $CNT_2$ of any node $N_i$ has updated the rise-timing interval $t_{i4}$ set thereon as address-signal-transmission-timing monitoring interval (hereinafter called from place to place as "address" monitoring period, some examples thereof being shown in FIG. 3 as aforementioned), when the node $N_i$ has normally received address signal $A_x$ and data signal D from any other node $N_x$ or when the node $N_i$ has normally transmitted therefrom address signal $A_i$ and data signal D.

In a case where node $N_i$ happens to malfunction, therefore, that one of the remaining nodes $N_x$ which is shortest of "address" monitoring interval is to first rise.

Exemplarily, in such a case that the n-th node $N_n$ is failing to rise for certain reason, the counter $CNT_2$ of the first node $N_1$ times up when the "address" monitoring interval $t_{14}$ has elapsed after reception of address signal $A_{n-1}$ and data D from the n−1-th node $N_{n-1}$, and the node $N_1$ starts transmitting signals $A_1$, D thereof when the monitoring interval $t_1$ has further elapsed from the time-up point of the counter $CNT_2$. Incidentally, in FIG. 3, such start points of signal transmission of some nodes ($N_1$ to $N_4$) are exemplarily marked by associated time-representative arrows, at $R_1$ for the first node $N_1$.

Likewise, even in the case where the first node $N_1$ is failing to rise for certain reason, the counter $CNT_2$ of the second node $N_2$ times up when the "address" monitoring interval $t_{24}$ has elapsed after reception of address signal $A_n$ and data signal D from the n-th node $N_n$, and the node $N_2$ starts transmitting signals $A_2$, D thereof when the monitoring interval $t_1$ has further elapsed from the time-up point of the counter $CNT_2$. For the second node $N_2$, the start point of signal transmission is marked at $R_2$ in FIG. 3.

As will be understood, in cases where arbitrary one $N_i$ of the nodes in the system 100 (but the first one $N_1$) happens to malfunction, it is the first node $N_i$ that comes first to rise. Moreover, it is in those cases where at least the first and second nodes $N_1$, $N_2$ are both caused to malfunction that the third node $N_3$ comes first to rise at a start point $R_3$ thereof in FIG. 3. Likewise, in those cases where at least the first to third nodes $N_1$ to $N_3$ are all caused to malfunction, the fourth node $N_4$ comes first to rise at a start point thereof $R_4$ in the same Figure.

In this connection, in the multiplex transmission system 100, each node $N_i$ is adapted, upon reception of address signal $A_x$ from any other node $N_x$, to have an address table of its own corrected, as necessary.

More particularly, in the system 100 in which, in dependence on address signal $A_i$ received from i-th node $N_i$, the node next to come to transmit signals thereof is selected to be i+1-th node $N_{i+1}$, in order to ensure such selection each of the nodes $N_1$ to $N_n$ has built in the memory thereof an exclusive-use address table adapted such that, in the initialization process upon the application of power, sets of data corresponding to respective address signals $A_1$ to $A_n$ are continuously written in order of suffix numeral "i" of associated reference character $A_i$ (hereinafter, also these sets of address data as well as their addresses are represented by corresponding characters $A_i$) and an address pointer is set so as to point at a first address $A_1$ in the address table.

In this respect, normally, with the address pointer pointing at one $A_i$ of the first to an n-th addresses $A_1$ to $A_n$ in the address table, the order of signal transmission of each node $N_i$ is determined.

At each node $N_i$, normally, when it has received address signal $A_j$ from any node $N_j$, the address pointer which has been pointing at a corresponding address $A_j$ till then is incremented to point at an address $A_{j+1}$ corresponding to the next node $N_{j+1}$ of the node $N_j$, that is, to the node next to come to perform signal transmission thereof. In the case where thus-pointed-at address $A_{j+1}$ falls in the same place as an address $A_i$ corresponding to the node $N_i$, this node $N_i$ judges that the order of its own signal transmission should come next.

The aforementioned correction of address table at each node N is executed in such a manner as will be described below with respect to a particular case.

As a comprehensible example, there is now supposed a case where, even after completion of signal transmission from the second node $N_2$, the third node $N_3$ will not rise.

Upon the completion of signal transmission from the second node $N_2$, at each of the respective nodes $N_1$, $N_2$, and $N_4$ to $N_n$ excepting the third node $N_3$ the address pointer is incremented so as to point at a third address $A_3$ in the address table.

In the present case, however, as aforementioned in conjunction with FIG. 3, as the next node there comes the first node $N_1$ to rise at a time point where the sum of the "address" monitoring interval $t_{14}$ and the monitoring interval $t_1$ has elapsed from the completion of signal transmission of the second node $N_2$, thus first transmitting therefrom the address signal $A_1$. At each of the remaining nodes $N_2$ and $N_4$ to $N_n$, based on the address signal $A_1$ then received it is judged that the address to be recognized from the content of address data now given is the first address $A_1$ that is different from the third address $A_3$ currently pointed at by the address pointer and besides antecedent in order to the third address $A_3$. Then, on the basis of this judgment, the third address $A_3$ in the address table is deleted, thereby shortening this table by one byte, and the address pointer is moved so as to point at the first address $A_1$ corresponding to the first node $N_1$ that has just transmitted the address signal $A_1$.

In the first node $N_1$, at a time point where the counter $CNT_2$ on which the "address" monitoring interval $t_{14}$ and a later-described "address" monitoring interval $t_{13}$ are set times up, the third address $A_3$ that has been pointed at till then by the address pointer in the address table is deleted from the address table, thereby shortening this table by one byte, and the address pointer is moved so as to point at the first address $A_1$ corresponding to the first node $N_1$ itself.

In the case in concern where the third node $N_3$ is failing to rise, therefore, as a result of such correction of address table, the remaining nodes $N_1$, $N_2$, and $N_4$ to $N_n$ are adapted to cooperate with one another to perform their signal transmission in the ascending order of suffix numerals in a cyclic manner.

In this connection, in cases where a certain node $N_j$ of which order of signal transmission has come next of any other node $N_x$ has an inherent address $A_j$ thereof larger of address number than that address $A_i (i<j)$ which is then pointed at by the address pointer, the node $N_j$ which might well have been malfunctioning for some reason can be put in order by properly writing the address $A_j$ in the address table.

FIG. 2B is a time chart for describing, in cases where, among the respective nodes $N_1$ to $N_n$ having been synchronized in the multiplex transmission system 100 as once normally started, arbitrary one $N_i$ happens to be kept from outputting data signal D thereof, how the remaining ones $N_x$ transmit address and data signals $A_x$, D thereof to the signal transmission lines 1a, 1b, whereas to avoid complicatedness there are shown in the Figure no more than those signals to be transmitted from the first node $N_1$ as $N_i$ and the second and the third nodes $N_2$, $N_3$ as $N_x$, whether real or imaginary.

In other words, there is supposed such a condition that only the data signal D of the first node $N_1$ is kept from being transmitted.

Incidentally, upon reception of address signal $A_i$ from arbitrary node $N_i$, each node $N_x$ has set on the counter $CNT_2$ thereof a data signal monitoring time interval $t_2$ of a time length to be determined depending on the received address signal $A_i$, such that:

$$t_2 = \tfrac{1}{2} t_1 (2 \cdot L_i + 1),$$

where $L_i$ is the word length in terms of byte of that data signal D which inherently is expected to be transmitted from the node $N_i$ that has just transmitted therefrom the address signal $A_i$, (provided that the suffix "i" of the term $L_i$ shall read "x" or "j" if so construed).

In the present case, the first node $N_1$ of which data signal D is predetermined to be one byte in word length corresponds to the node $N_i$ and hence $L_i = 1$, so that:

$$t_2 = \tfrac{1}{2} t_1 (2 \cdot 1 + 1) = (3/2) t_1.$$

At each node $N_x$ with the supervising period $t_2$ of such length set on the counter $CNT_2$, the counter $CNT_2$ starts counting down the monitoring interval $t_2$ upon completion of transmission of the address signal $A_i$ ($A_1$ in this case) and times up when the interval $t_2$ has elapsed.

Such time-up point of the counter $CNT_2$ is marked on the associated time axis of each node $N_x$ in FIG. 2B, at $U_2$ for the second node $N_2$ and $U_3$ for the third node $N_3$. It will be understood that, in any other node $N_x$, the counter $CNT_2$ times up at the same time point after time interval $t_2$.

Moreover, at each node $N_x$, that is, at any of the second to the n-th nodes $N_2$ to $N_n$ in this case, just after having timed up, the counter $CNT_2$ has set thereon the address-signal-transmission-timing monitoring time interval $t_{13}$ (hereinafter called as "address" monitoring interval), of which time length is determined such that:

$$t_{13} = t_{14} - \tfrac{1}{2} t_1,$$

where suffix i shall read x as a matter of course.

Then, at each node $N_x$, the address pointer is incremented, thereby judging whether or not the order of its own signal transmission should come next.

Here, only the second node $N_2$ judges that the signal transmission of the node $N_2$ itself should be performed next. Each of the remaining nodes $N_3$ to $N_n$, judging that the order of its own signal transmission will not come next, enters a waiting state thereof, where it waits signal transmission from the second node $N_2$.

Further, at the second node $N_2$, the address pointer is again incremented, just before the signal transmission of the node $N_2$ itself.

Then, at a time point where the time-base interval $\tfrac{1}{2} t_1$ has elapsed from the time-up point marked at $U_2$ or $U_3$, the second node $N_2$ opens switches 4a, 4b of switching circuits 4 thereof and starts signal transmission.

Thereafter, the remaining nodes $N_3$ to $N_n$ likewise perform signal transmission thereof one after another in the ascending order of suffix numeral, thereby constituting a cycle together with the first and the second nodes $N_1$, $N_2$. In the system 100, such cycle is ceaselessly repeated, whereas at the first node $N_1$ the address signal $A_1$ only is to be transmitted while the node $N_1$ is left as it is kept from outputting data signal D thereof.

FIG. 2C is a time chart for describing, in cases where, among the respective nodes $N_1$ to $N_n$ which have been synchronized in the multiplex transmission system 100 as once normally started, an arbitrary node $N_i$ happens to be kept from outputting data signal D thereof and besides that one, node $N_{i+1}$ whose of which order of signal transmission inherently should come next also fails to transmit address and data signals $A_{i+1}$, D. FIG. 2C shows how the remaining nodes $N_x$ (where suffix x is not equal to i nor i+1) transmit address and data signals $A_x$, D to the signal transmission lines 1a, 1b. In order to avoid complicatedness there are shown in the FIG. 2c no more than those signals to be transmitted from the n−1-th node $N_{n-1}$ as $N_i$, the n-th node $N_n$ as $N_{i+1}$, and the first node $N_1$ as $N_x$, whether real or imaginary.

In other words, there is supposed such a condition that only the data signal D of the n−1-th node $N_{n-1}$ and the address and the data signals $A_n$, D of the n-th node $N_n$ are kept from being transmitted.

In this connection, it is further supposed that, among respective combination signals to be transmitted from the nodes $N_1$ to $N_n$, that one which is longest in word length consists of an address signal 1-byte long and a data signal 3-bytes long, thus having a 4-byte length in total. As a result, the unit length X in FIG. 3 becomes equal to $4t_1$, that is, $X=4t_1$. It thus so follows that: $t_{14}=X \cdot 1=4t_1$; and $t_{13}=t_{14}-\frac{1}{2}t_1=3.5t_1$.

In the present case, upon reception of the address signal $A_{n-1}$ from the n−1-th node $N_{n-1}$, each normal node $N_x$ (x=1 to n−2 in this case) has set on the counter $CNT_2$ thereof a data signal monitoring interval $t_2$ with a time length determined from the received address signal $A_{n-1}$. When supposing that the word length of that data signal D which inherently is expected to be transmitted from the n−1-th node $N_{n-1}$ is one byte, that is, $L_i=1$, the monitoring interval $t_2$ is to be given such that:

$$t_2=\tfrac{1}{2}t_1(2 \cdot 1+1)=(3/2)t_1.$$

At each node $N_x$ with the monitoring interval $t_2$ of such time length set on the counter $CNT_2$, the counter $CNT_2$ starts measuring the interval $t_2$ upon completion of transmission of the address signal $A_{n-1}$ and times up when the interval $t_2$ has elapsed.

For the first node $N_1$, such time-up point of the counter $CNT_2$ is marked at $U_{12}$ on associated time axis in FIG. 2C. It will be understood that, in any other node $N_x$, the counter $CNT_2$ times up at the same time point.

Moreover, at each node $N_x$, just after having counted out the data signal supervising period $t_2$, the counter $CNT_2$ has set thereon the "address" monitoring interval $t_{i3}$, where suffix i shall read x as a matter of course.

Then, at each node $N_x$, the address pointer is incremented, thereby judging whether or not the order of its own signal transmission should come next.

Here, however, the node next to come to perform its own signal transmission inherently is the n-th node $N_n$. Any other node $N_k$, thus judging that the order of its own signal transmission will not come next, enters a waiting state thereof, where it waits signal transmission from the n-th node $N_n$.

In the case case in concern, however, the n-th node $N_n$ will not perform signal transmission. As a result, when the "address" monitoring interval $t_{13}$ has elapsed from the time-up point $U_{12}$ of the counter $CNT_2$ at the first node $N_1$, this counter $CNT_2$ again times up, which time-up point is marked at $U_{13}$ in FIG. 2C.

After lapse of the monitoring interval $t_1$ from the time-up point $U_{13}$ above, at the first node $N_1$, the address pointer is set so as to point at the address $A_1$ of the node $N_1$ itself. Then, with the switches 4a, 4b of the switching circuit 4 opened, the node $N_1$ starts signal transmission thereof, whereas the address pointer of the node $N_1$ is again incremented just before the signal transmission.

Thereafter, the remaining nodes $N_2$ to $N_{n-2}$ likewise perform signal transmission thereof one after another in the ascending order of suffix numeral, thereby constituting a cycle together with the first node $N_1$ and, in some cases, with the n−1-th node $N_{n-1}$ and/or the n-th node $N_n$. In the system 100, such cycle is ceaselessly repeated, whereas, between the signal transmission of the n−2-th node $N_{n-2}$ and that of the first node $N_1$, only the address signal $A_{n-1}$ of the n−1-th node $N_{n-1}$ is to be transmitted if this node $N_{n-1}$ is still kept from outputting data signal thereof and the n-th node $N_n$ remains malfunctioning.

Referring now to FIGS. 4A to 4C and 5, description will be collectively made of flows of control programmed, in respective control circuits 5 of the nodes $N_1$ to $N_n$, to achieve such functions of the multiplex transmission system 100 as described. Respective programs in the control circuits 5 are all of such a structure as represented by a control flow shown in FIG. 4A, whereas the "address" monitoring interval $t_{i3}$ to be set at a later-described stage 71 of the flow and the "address" monitoring interval $t_{i4}$ to be set at later-described stages 54, 62, 84, and 88 of same have values thereof predetermined to be each respectively proper to correspond to one of the nodes $N_1$ to $N_n$.

It should be noted that, for easy understanding, the flow is now presumed to pertain to a particular one $N_i$ of the nodes $N_1$ to $N_n$ and shall be so regarded unless otherwise construed from the context.

With power applied, the flow starts at a stage 50, and various initialization processes are executed at a stage 51.

Next, at a stage 52, the input terminal 3a of the receiver 3 is selected for signal reception. Then, at a stage 53, the counter $CNT_1$ is reset. Further, at a stage 54, the counter $CNT_2$ has set thereon a time $k \cdot t_{i4}$ of the "address" monitoring interval $t_{i4}$ times k, where k is an integer desired to be 10 or more, and a start flag (not shown) is reset "0", which flag is used, when in a later-described stage 66 the time-up flag $F_4$ is judged to have timed up, for judging whether or not the time-up is of the first time.

In this respect, when the counter $CNT_2$ has set thereon the monitoring interval $t_2$, $t_{i3}$, or $t_{i4}$, only that one of a triple of appointing flags $f_2$, $f_3$, $f_4$ which corresponds to the content of such setting is set to "1", with the rest reset to "0", and each of the time-up flags $F_2$, $F_3$, $F_4$ that is to be set to "1" when corresponding one of the intervals $t_2$, $t_{i3}$, $t_{i4}$ as set has timed up together therewith is reset to "0". In FIG. 5 are shown interrelations and functions of those flags $F_2$, $F_3$, $F_4$ and $f_2$, $f_3$, $f_4$.

Incidentally, in the case where at the stage 54 the counter $CNT_2$ has set thereon a time of $10t_{i4}$, the appointing flag $f_4$ is set to "1".

With respect to the counters $CNT_1$ and $CNT_2$, supplementary description will follow.

The counter $CNT_1$ is adapted, when once reset, to send one pulse to an interrupt terminal (not shown) of the CPU of the control circuit 5 every time when the interval $\frac{1}{2}t_1$ has elapsed, and the counter $CNT_2$ is adapted to send one pulse to another interrupt terminal (not shown) of the CPU when the time interval $t_2$, $t_{i3}$, or $t_{i4}$ as set on the counter $CNT_2$ has elapsed, whereas, between the above two interrupt terminals, that one which receives the pulse from the counter $CNT_1$ has priority of interruption to the other.

Figure 4A:
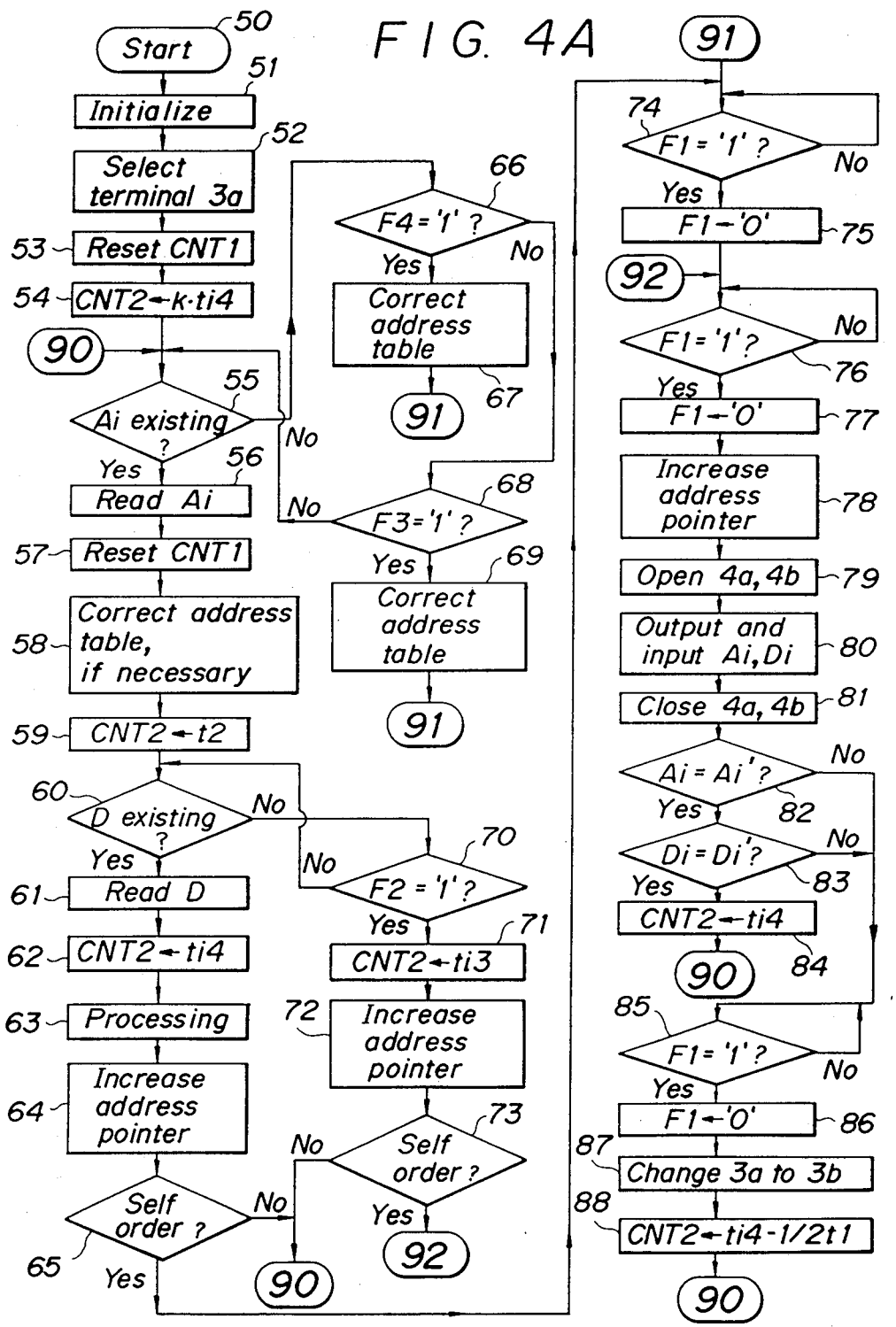

A pair of sub-routines for handling such interruption are shown in FIGS. 4A and 4B, respectively.

The sub-routine shown in FIG. 4B is adapted to handle the interruption from the counter $CNT_1$.

In this interrupt handler, at a stage 95b, additional interrupt is first disabled. Then, at a stage 95c, the time-up flag $F_1$ for measuring the time-base interval $\frac{1}{2}t_1$ is set to "1", irrespective of the state that the flag $F_1$ then has. Thereafter, at a stage 95d, interrupt is enabled, then the flow returns from a stage 95e to the main control routine.

The sub-routine of FIG. 4C is adapted to handle the interruption from the counter $CNT_2$.

In this interrupt handler also, at a stage 96b, additional interrupt is first disabled. Then, at a stage 96c, that one $F_i$ (where suffix i=2, 3, or 4) of the time-up flags which corresponds to that appointing flag $f_i$ (where suffix i=2, 3, or 4) which is then set to "1" is set to "1". Thereafter, at a stage 96d, interrupt is enabled, then the flow returns from a stage 96e to the main routine.

Returning now to FIG. 4A, continued description will be made of the control flow.

After necessary processes at the stage 54, while going round a triple of decision stages 55, 66, and 68, the flow as well as the node $N_i$ enters and indling state thereof, where it waits an address signal $A_j$ from any node $N_j$.

If received during the idling state, address signal $A_j$ from any node $N_j$ is read at a stage 56.

On the other hand, during the idling state, if the address monitoring flag $F_4$ as set to "1" is detected at the stage 66, the flow goes to a stage 67, where it first judges whether or not the start flag is set to "0".

If the start flag is judged to be "0", the flow goes, after having the start flag set to "1", simply to a later-described stage 74. In the case where the start flag is judged to be "1", the address table is corrected and the address pointer is set so as to point at the address $A_i$ of the node $N_i$ itself; thereafter the flow goes to the stage 74.

Likewise, during the idling state while the flow is going round the stages 55, 56, 68, if the address monitoring flag $F_3$ as set to "1" is detected at the stage 68, the flow goes to a stage 69, where the address table is corrected and the address pointer is set so as to point at the address $A_i$ of the node $N_i$ itself. Thereafter, the flow goes to the stage 74.

As described, when judged existing at the stage 55, any address signal $A_j$ is read at the stage 56; then, the counter $CNT_1$ is reset at a stage 57.

Next, at a stage 58, it is judged whether or not the address signal $A_j$ just read is correspondent to that address which is pointed at by the address pointer. If the signal $A_j$ is correspondent, the flow goes to a stage 59, without any correction of the address table. However, if it is not correspondent, the address table is shortened to be corrected by one byte and the address pointer is set so as to point at that address $A_j$ which is correspondent to the address signal $A_j$ just read; thereafter the flow goes to a stage 59.

At the stage 59, the counter $CNT_2$ has set thereon the "data" monitoring interval $t_2$ of a length that depends on the address signal $A_j$ read at the stage 56.

Subsequently thereto, while going round a pair of decision stages 60, 70, the flow as well as the node $N_i$ enters an idling state thereof, where it waits a data signal D to be transmitted from that node $N_j$ which has transmitted the address signal $A_j$ read above.

If received during this idling state, data signal D is read at a stage 61.

On the other hand, during this idling state, if the data monitoring flag $F_2$ as set to "1" is detected at the stage 70, the flow goes to a stage 71, where the counter $CNT_2$ has set thereon the "address" monitoring interval $t_{i3}$ to be used against abnormalities.

Then, at a stage 72, the address pointer is incremented and, at a stage 73, there is made a judgment whether or not the order of signal transmission of the flow or the node $N_i$ itself is next.

In the case where the order of its own signal transmission is judged to come next, the flow goes to a later-described stage 76.

To the contrary, if its own order is judged not to come next, the flow goes to the decision stage 55 to enter the idling state, where it now waits a data signal D from that node $N_{j+1}$ which is at the order next to come to perform signal transmission.

As described, when judged existing at the stage 60, data signal D is read at the stage 61; then, at a stage 62, the counter $CNT_2$ has set thereon the "address" monitoring interval $t_{i4}$ to be used under normal conditions, which interval $t_{i4}$ is of such a length that depends on the number i of the node $N_i$ itself.

Moreover, at a stage 63, necessary signal processes are executed in accordance with the content the signals $A_j$ and D which were read at the stages 56 and 61, respectively. Also in the case where the data signal D is followed by the abnormality information signal which informs that the content of a transmitted signal in the last cycle is ineffective, necessary signal processes are executed at the same stage 63. At this stage 63, there is further executed a process for inputting data from those sensors which are put under control of the node $N_i$ itself.

Upon completion of processes at the stage 63, the flow goes to a stage 64, where the address pointer is incremented to thereby again judge, at a stage 65, whether or not the order of signal transmission of the flow or the node $N_i$ itself should come next.

In the case where, at the stage 65, the order of its own signal transmission is judged to come next, the flow goes to the stage 74.

To the contrary, if its own order is judged not to come next, the flow goes to the decision stage 55 to enter the idling state, where it now waits an address signal $A_{j+1}$ from that node $N_{j+1}$ which is at the order next to come to perform signal transmission.

Incidentally, at the stages 56 and 61, the address signal $A_j$ or the data signal D is read by 4 bits at intervals of the time base $\frac{1}{2}t_1$. Further, the necessary time interval for processes at the stage 63 is extremely shorter than the time-base interval $\frac{1}{2}t_1$.

At the stage 74, while idling, the flow is kept waiting till the time-base measuring flag $F_1$ is set to "1".

When the flag $F_1$ has become "1", the flow goes to a stage 76, where it resets the flag $F_1$ to "0".

Thereafter, at stages 76 and 77, the time-base interval $\frac{1}{2}t_1$ is consumed.

Then, at a stage 78, the address pointer is incremented.

As will be understood, it is only when the order of signal transmission of the flow or the node $N_i$ itself has come that the flow comes to and passes the stage 78.

After having passed as an approach toward such transmission a stage 79 where the switches 4a, 4b of the switching circuit 4 are opened, the flow comes to a stage 80 where its own address signal $A_i$ and data signal D of a necessary number of bytes are transmitted from the transmitter 2 and concurrently read into the diagnosis circuit 6, where they are stored in the form of $A_i'$ and D'. In such signal transmission, if the content of the abnormality information signal informing that the content of a transmitted signal in the last cycle is ineffective is stored in the memory, this signal is attached from behind to the normal data signal D and transmitted together therewith.

Upon completion of the signal transmission at the stage 80, the flow goes to a stage 81 where the switches 4a, 4b of the switching circuit are closed.

Then, at stages 82 and 83, a judgment is made of the transmitted signals $A_i$ and D as to whether or not they are equal to the stored signals $A_i'$ and D', respectively.

In the case where they are judged both equal, the flow goes to a stage 84, where the counter $CNT_2$ has set thereon the "address" monitoring interval $t_{i4}$ for normal use; thereafter it goes the stage 55, where it waits an address signal $A_{i+1}$ to be transmitted from that node $N_{i+1}$ of which order of signal transmission comes next.

If either of the transmitted signals $A_i$, D is judged unqual to the stored signals $A_i'$, D', the flow goes to a stage 84, where it is kept waiting while idling till the time-base measuring flag $F_1$ becomes "1".

When the flag $F_{i1}$ has become "1", the flow goes to a stage 86, where it resets the flag $F_1$ to "0".

Then, at a stage 87, the input terminal 3b is selected (in place of the terminal 3a) to be connected to the reception terminal 3c of the receiver 3. Then, at a stage 88, the counter $CNT_2$ has set thereon a time interval of $t_{i4} - \frac{1}{2}t_1$, and the memory has stored therein the content of the abnormality information signal to be transmitted in the next cycle to inform that the content of transmitted signal in the present cycle is ineffective.

Thereafter, the flow goes to the stage 55, where it again waits an address signal $A_j$ from any node $N_j$.

Incidentally, in the multiplex transmission system 100, at each $N_i$ of the nodes $N_1$ to $N_n$, every time when it normally receives address signal $A_x$ and data signal D from any other node $N_x$, the counter $CNT_2$ has updated and set thereon the "address" monitoring interval $t_{i4}$, that is, the rise-timing interval of a length proper to the node $N_i$ itself.

Moreover, each node $N_i$ is adapted, when the rise-timing interval $t_{i4}$ as thus set is timed up, to rise to start transmitting address and di ta signals $A_i$, D thereof, which means that the counter $CNT_2$ is adapted to function as a rise-timing timer.

In the transmission system 100, therefore, even when any node $N_i$ is brought into an abnormal state in which it fails to perform signal transmission, that one of the remaining nodes $N_x$ which is shortest thereamong of the set interval $t_{i4}$ is let to rise, thus effectively avoiding malfunction of the entire system 100.

Similar advantage is expectable also of the "address" monitoring interval $t_{i3}$ to be set, when certain node $N_i$ has transmitted the address signal $A_i$ only, on the counter $CNT_2$ of any other node $N_x$, as described in conjunction with FIG. 2C.

According to the embodiment, therefor, any of the nodes $N_1$ to $N_n$ is effectively let to rise by usising the counter $CNT_2$ as a rise-timing timer. It will be understood that such rise control system is advantageously applicable also to a multiplex transmission system which employs a unilateral signal transmission path instead of bilateral one.

Moreover, in the multiplex transmission system 100, at each node $N_i$, the address and data signals $A_i$, D as transmitted from the transmitter 2 of the node $N_i$ to the signal transmission path are concurrently received by the receiver 3 of the same node $N_i$ and, by the diagnosis circuit 6, the content of the received signals is checked against that of the transmitted signals.

In other words, through such diagnosis by checking, data check of received signals is effected at that node which has transmitted the signals.

In this respect, if data abnormality is detected at any node $N_i$, the node $N_i$ is adapted, in the next line of its own signal transmission, to add to the data signal D, at the rear thereof, the abnormality information signal informing that the content of transmitted signals $A_i$, D in the last time (that is, at that time in which the abnormality is detected) is ineffective and transmit them together.

Further, at the node $N_i$ where the data abnormality is detected, one (3a in this embodiment) of the input terminals 3a, 3b of the receiver 3 is changed over to the other (3b), so that, even after certain abnormality such as disconnection has occurred on the bilateral signal transmission path at either side 1a or 1b thereof (1a in this embodiment), it is permitted to perform signal transmission and reception through the transmission path by using the transmission line (1b) at the other side.

Such advantage is likewise available even in a case where each $N_i$ of the nodes $N_1$ to $N_n$ is modified such that a check code is attached at the rear of data signal D of such number of bytes as peculiar to the node $N_i$ and transmitted together.

Incidentally, in the multiplex transmission system 100, even in the event that two or more codes are caused to concurrently perform signal transmission thereof for some reason, the respective nodes in concern are brought, after signal transmission line change-over actions due to diagnoses by checking, into the waiting states thereof, where they wait signal transmission from other nodes, so that, as predetermined time intervals elapse, they are permitted to normally perform signal transmission, thereby eliminating the fear of malfunction of the entire system 100.

In this respect, the unit time length X described in conjunction with FIG. 3 may preferably be changed so as to be equal to integer-times (exemplarily twice) as long as, among necessary signal transmission periods of respective nodes $N_1$ to $N_n$, the longest one, so that, when an abnormality such as disconnection has occurred at the signal transmission line 1a, probable temporary troubles of signal transmission and reception can be effectively avoided, as additional advantage.

With such point in view, a modification of rise-timing timer is now provided. An associated time chart is shown in FIG. 6. Like parts and parameters are designated by like reference characters.

As will be seen from FIG. 6, in the modification of rise-timing timer, at each node $N_i$, although the length of a rise-timing monitoring interval $t_{i4}$ to be set on a counter $CNT_2$ corresponds to that in the embodiment as the system 100, at the first time-up point of the counter $CNT_2$ a signal transmission line $1a$ is simply changed over to another signal transmission line $1b$ and cncurrently the monitoring interval $t_{i4}$ is again set on the counter $CNT_2$. After lapse of a monitoring interval $t_1$ from time-up of thus set counter $CNT_2$, signal transmission is started.

In FIG. 6 also, X represents a unit time length, which is set equal to the unit time length X of FIG. 3.

On time axis of a first node $N_1$, marked at reference character $S_1$ is a time point at which the rise-timing interval $t_{14}$ of the node $N_1$ has elapsed. At the point $S_1$, an input terminal $3b$ of a receiver 3 in the node $N_1$ is simply selected to be connected to a reception terminal $3c$ of same and the interval $t_{14}$ is again set on the counter $CNT_2$. Thereafter, the node $N_1$ functions in a similar manner to the embodiment 100.

Namely, when the time interval $t_{14}$ as set at the time point $S_1$ has elapsed, the counter $CNT_2$ of the node $N_1$ times up; then, after additional lapse of the monitoring interval $t_1$ from the this time-up point, the node $N_1$ starts signal transmission thereof. This start point of transmission is marked at $R_1$ in FIG. 6.

Likewise, those time points at which counters $CNT_2$ of a second, a third, and a fourth nodes $N_2$, $N_3$, $N_4$, as they have set thereon rise-timing monitoring time intervals $t_{24}$, $t_{34}$, $t_{44}$, respectively, have timed up for the first time are marked at $S_2$, $S_3$, $S_4$, respectively, in FIG. 6. Further, respective starts points of signal transmission of the nodes $N_2$, $N_3$, $N_4$ are marked at $R_2$, $R_3$, $R_4$ in FIG. 6.

The above modification employs like control flow to the flow shown in FIG. 4A, excepting a portion includging the stages 66, 67, 68 and 69 of FIG. 4A. In the modification, this portion is modified as shown in FIG. 7.

More particularly, in the modification, in relation to counter $CNT_2$, besides respective flags $F_2$, $F_3$, and $F_4$ listed in the table of FIG. 5, there is employed a re-set flag Fd for indicating that the time interval $t_{i4}$ is again set on the counter $CNT_2$. The flag Fd is adapted to be reset to "0" when any of the time intervals $t_2$, $t_{i3}$, $t_{i4}$ is set on the counter $CNT_2$.

As will be seen from FIG. 7, at a decision stage 366, it is judged whether or not the flag $F_4$ is set to "1".

If the flag $F_4$ is "1", the flow goes to the next decision stage 367, where it judges whether or not the re-set flag Fd is set to "1".

If the flag Fd is "1", like the embodiment, a judgment is made at the next stage 368 as to whether or not a start flag is "0". If the start flag is "0", the flow goes to a stage 74, after having set the start flag to "1".

On the other hand, in the case where, at the stage 368, the start flag is judged to be "1", an address table is corrected and an address pointer is set so as to point at an address $A_i$ of the flow or node $N_i$ itself; then, the flow goes to the stage 74.

In the case where, at the stage 367, the re-set flag Fd is judged not to be "1", the flow goes to a stage 369, where the time interval $t_{i4}$ is set on the counter $CNT_2$.

Then, at the next stage 370, the re-set flag Fd is set to "1"; thereafter, at a stage 371, the input terminal $3a$ of the receiver 3 is changed over to the terminal $3b$. Thereafter, the flow goes to a stage 55.

Further, in the case where, at the stage 366, the flag $F_4$ is judged not to be "1", the flow goes a decision stage 372, where it judges whether or not the flag $F_3$ is set to "1".

If the flag $F_3$ is set to "1", the flow goes to the stage 369. If it is not so set, the flow goes to the stage 55.

In the foregoing modification in which the monitoring time interval $t_{i4}$ is twice set on the counter $CNT_2$, stage 58 may preferably be modified such that, in a case where for an address signal $A_j$ just received from any node $A_j$ the address table has no place reserved, then a corresponding address $A_j$ is to be written in the address table.

According to the modification described, it is permitted to effectively avoid the malfunction of the entire system due to abnormalities such as disconnection of signal transmission line $1a$.

In cases where the signal transmission line $1a$ is free of abnormalities, any node $N_j$ may well be put in an abnormal state. In such case, among those nodes $N_i$ which are then normally operating, that one which is shortest of the time interval $t_{i4}$ as set is to first rise, so that the possibility of malfunction of the entire system can be successfully kept minimized.

Incidentally, the modification above may preferably be further modified such that a first node $N_1$ only is permitted to rise at a time point where a monitoring time interval $t_{i4}$ is timed up for the first time.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. A multiplex transmission system comprising:
   a signal transmission path connecting a plurality of communication nodes in a communication loop; and
   a plurality of communication nodes coupled for communication with each other via the signal transmission path, each node being respectively connectable to control a different unit of electrical equipment, each of said nodes comprising:
   a transmitter connected to seize control of the signal transmission path and transmit a prepared signal to said signal transmission path;
   a receiver connected to receive a prepared signal generated by a different one of the plurality of communicating nodes from said signal transmission path; and
   a control circuit coupled to control the transmitter, the receiver and a connected electrical unit, he control circuit storing a unique node address from a set of ordered addresses assigned to different communication nodes within the system and having a monitor interval timer that is set upon receipt of the prepared signal from a different node over the signal transmission path, the control circuit commanding the transmitter to seize control of the signal transmission path and transmit a prepared signal in sequential order of the stored unique address or upon an occurrence of a timeout from the monitor interval timer, whichever occurs first.

2. A multiplex transmission system according to claim 1, wherein:
said interval timer is set upon transmission of the prepared signal to the signal transmission path by the transmitter.

3. A multiplex transmission system according to claim 2, wherein
includes a unit interval timer and wherein the control circuit delays commanding the transmitter to seize control of the signal transmission path and transmit until after the unit interval timer has timed out following a time out from the monitor interval timer.

4. A multiplex transmission system according to claim 1, wherein at each node in the system the time interval of the monitor interval timer is at least as long as a longest time that is required for transmission of a prepared signal by any node in the system.

5. A multiplex transmission system according to claim 4, wherein at each node in the system the time interval of the monitor interval timer is an integer multiple of a given time interval that is at least as long as a longest time that is required for transmission of a prepared signal by any node in the system.

6. A multiplex transmission system according to claim 1, wherein said signal transmission path includes two signal transmission lines carrying transmitted signals in opposite directions;
said receiver at each node includes a switch that selectively couples the receiver to one of the two signal transmission lines and couples the receiver to a predetermined signal transmission line in response to an application of power to the node; and
said control circuit responds to a first occurrence of a monitoring interval timer time out by commanding the receiver switch to couple the receiver to a different one of the signal transmission lines and responds to a subsequent occurrence of a monitor interval timer time out by commanding the transmitter to seize control of the signal transmission path and transmit the prepared signal.

7. A multiplex transmission system according to claim 1, wherein:
said signal transmission path includes two signal transmission lines carrying transmitted signals in opposite directions;
said receiver at each node includes a switch that selectively couples the receiver to one of the two signal transmission lines and couples the receiver to a predetermined signal transmission line in response to an application of power to the node; and
each mode further comprises a diagnostic circuit coupled to receive the prepared signal being transmitted by the node both directly from the transmitter and through the signal path and receiver and to provide an abnormality indication to the control circuit when there is a difference between the two signals.

8. A multiplex system according to claim 7, wherein each node includes a path switch connected in series with the signal transmission path which is operable to open the signal transmission path at the node when the transmitter at the node is transmitting and to close the signal transmission path when the transmitter at the node is not transmitting, the transmitter and receiver being coupled to the signal transmission path on opposite sides of the path switch.

9. A multiplex transmission system according to claim 8, wherein:
said controlling means at each of said node responds to an abnormality indication from the diagnosis circuit by commanding the receiver switch to couple the receiver to a different one of the signal transmission lines.

10. A multiplex system according to claim 9, wherein:
said control circuit responds to receipt of an abnormality indication from the diagnosis circuit by commanding the transmitter to transmit a prepared signal indicating that the previous transmission from the node was defective the next time the transmitter has an opportunity to transmit a prepared signal onto the transmission path.

11. A multiplex transmission system according to claim 10, wherein:
each prepared signal transmitted by a transmitter of a node to the signal transmission path includes an address portion representing the node address of the transmitting node and a data portion having a length that is pre-assigned at each node.

12. A signal transmission system comprising:
a signal transmission path connecting a plurality of nodes in a signal communication loop; and
said plurality of nodes, each connected to control one of a plurality of units of electrical equipment, each of said nodes including,
a transmitter connected to transmit a selected signal onto the signal transmission path in a predetermined order associated with the node, the transmitter having control of the signal path while transmitting the selected signal;
a receiver connected to receive the selected signal from the signal transmission path;
a control circuit connected to control the transmitter, the receiver and an associated unit of electrical equipment, the control circuit commanding the transmitter to transmit a selected signal upon reaching the node in the predetermined order and in response to receipt of a time out signal; and
a rise-timing timer adapted to be set upon transmission by a system node to time a predetermined rise-timing time interval of a duration associated with the node which is sufficient to indicate a failure of a node to transmit a signal and to generate said time out signal at the end of the time interval.

13. A signal transmission system comprising:
a signal transmission path; and
a plurality of nodes coupled to communicate via the signal transmission path, each node including:
a path switch connected in series with the transmission path to open the transmission path when the node is transmitting and to complete the transmission path when the node is not transmitting;
a transmitter connected to the transmission path on a transmitter connection side of the path switch, the transmitter being operable upon receipt of a transmit command to seize control of the transmission path and transmit a message;
a receiver connected to receive a message being transmitted on the transmission path, the receiver being connected to the transmission path on a receiver connection side of the path switch opposite the transmitter connection side; and a control circuit coupled to provide transmit commands to the transmitter and to receive transmitted messages from the receiver, the control circuit storing an address uniquely assigned to each node from an ordered set of addresses and providing to the transmitter a transmit command causing the transmitter to seize control of the transmission path and transmit thereon a message in the order of the assigned address in the set of addresses such that each node cyclically transmits a message in order, the control circuit further including an interval timer which is set to time a predetermined time interval each time a message is transmitted over the transmission path and responding to a time out of the interval timer by commanding the transmitter to transmit a message, the predetermined time interval being different for each node in the system so that the nodes experience a time out and attempt to transmit in a sequence when no messages are being transmitted on the transmission path.

14. A signal transmission system according to claim 13 wherein the predetermined time interval is an integer multiple of a given time interval that is at least as long as the longest time interval required for transmission of a message by any node in the system.

15. A signal transmission system according to claim 14 wherein the integer multiple is the same as the uniquely assigned address.

16. A signal transmission system according to claim 13 wherein the signal transmission path includes at least first and second independent signal lines, wherein the transmitter incudes a transmitter switch selectively coupling the transmitter either to the first signal line on one side of the path switch or alternatively to the second signal line on a side of the path switch opposite the one side, and wherein the receiver includes a receiver switch selectively coupling the receiver to the same signal line as the transmitter.

17. A signal transmission system according to claim 16 wherein each node further comprises a diagnosis circuit operable when the transmitter is transmitting to receive copies of a transmitted message both directly from the transmitter and through the transmission path and receiver and to provide to the control circuit an abnormality indication when the two copies are different, the control circuit responding to an abnormality indication by commanding the transmitter and receiver switches to switch to a different signal line.

18. A signal transmission system according to claim 17 wherein each control circuit further responds to a received abnormality indication by commanding at the next transmission opportunity of the node in the assigned order that a message be transmitted that indicates the preceding message transmitted by the node was not transmitted error free.

19. A signal transmission system according to claim 13 wherein the control circuit at each mode stores a table listing in the order in which the nodes transmit, the address and message length for each active node in the system, maintains a pointer indicating which node is to transmit a messge next, and deletes from the table the data corresponding to any node which fails to transmit a message in its turn, the control circuit commanding the transmitter at its own node to transmit a message when the pointer points to its own address.

* * * * *

UNITED STATES PATENT AND TRADEMARK OFFICE
CERTIFICATE OF CORRECTION

PATENT NO. : 4,747,097
DATED : May 24, 1988
INVENTOR(S) : Harutada Ohya et al

It is certified that error appears in the above-identified patent and that said Letters Patent are hereby corrected as shown below:

Column 2, line 62, "bidirectional bilateral" should read --bidirectional or bilateral--.

Column 4, line 26, "each. of" should read --each of--.

Column 4, line 36, "lines, The" should read --lines. The--.

Column 4, lines 41-42, "transmission its own, for receiving through the" should read --transmission, for receiving through its own--.

Column 7, line 44, "counter" should read --count--.

Column 8, line 11, "point" should read --pointer--.

Column 8, line 22, "the" (second occurrence) should read --for--.

Column 15, line 14, after "whose" and before "order" delete --of which--.

UNITED STATES PATENT AND TRADEMARK OFFICE
CERTIFICATE OF CORRECTION

PATENT NO. : 4,747,097

DATED : May 24, 1988

INVENTOR(S) : Harutada Ohya et al

It is certified that error appears in the above-identified patent and that said Letters Patent are hereby corrected as shown below:

Column 19, line 40, "unqual" should read --unequal--.

Column 19, line 41, "84" should read --85--.

Column 19, line 64, "di ta" should read --data--.

Column 21, lines 11-12, "cncurrently" should read --concurrently--.

Column 21, line 41-42, "includging" should read --including--.

Column 22, line 61, "he" should read --the--.

Column 23, line 11, "wherein" should read --wherein said control circuit--.

Column 24, line 32, "including," should read --including:--.

Column 25, line 34, "incudes" should read --includes--.

Signed and Sealed this

Twenty-ninth Day of November, 1988

Attest:

DONALD J. QUIGG

*Attesting Officer*    *Commissioner of Patents and Trademarks*